Patented June 16, 1936

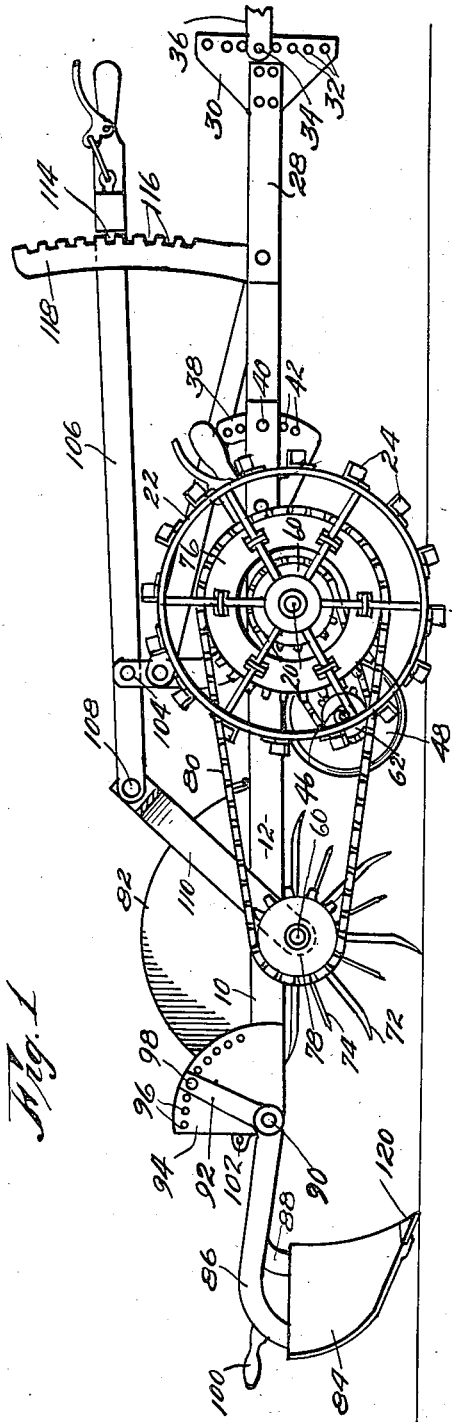

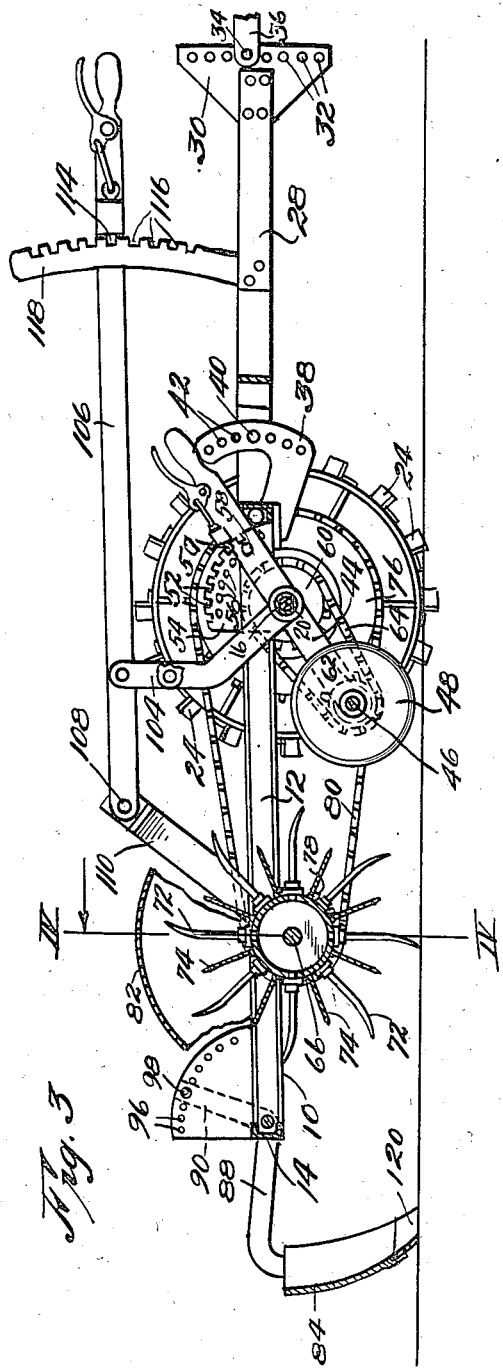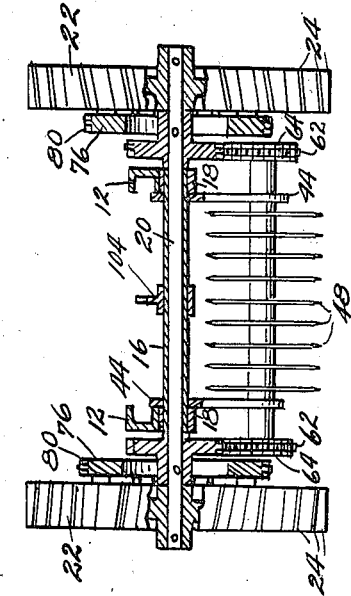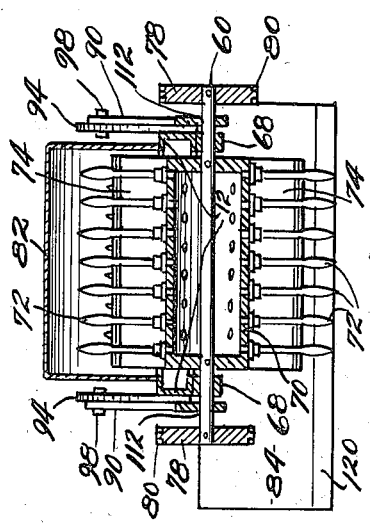
INVENTOR,
Edward M. Nowlin.
BY
ATTORNEYS

2,044,507

UNITED STATES PATENT OFFICE 2,044,507

WHEELED PULVERIZING AND GRADING MACHINE

Edward M. Nowlin, Kansas City, Mo.

Application March 9, 1935, Serial No. 10,233

5 Claims. (Cl. 97—40)

This invention relates to improvements in wheeled pulverizing and grading machines, and particularly to that type of machine adapted for use on the farm or for road grading.

The principal object of the invention is the provision of a wheeled pulverizing and grading machine having power-driven disc cutters and teeth which are adapted to thoroughly work the ground.

A further object of the present invention is the provision of a pulverizing and grading machine having two sets of cutters disposed at an angle to each other, whereby stocks, weeds, etc. will be cut into small pieces regardless of their position on the ground.

Another object is the provision of a pulverizing and grading machine having groups of ground working tools and a grading blade that are independently adjustable.

Reference will now be had to the drawings, wherein:

Figure 1 is a side elevation of a wheeled pulverizing and grading machine embodying this invention.

Fig. 2 is a plan view of the same, with parts broken away for clearness.

Fig. 3 is a vertical section, taken on line III—III of Fig. 2.

Fig. 4 is a vertical cross section, taken on line IV—IV of Fig. 3, and,

Fig. 5 is a vertical cross section, taken on line V—V of Fig. 2.

Throughout the several views like references designate similar parts and the numeral 10 indicates a fabricated frame, made of any suitable material such as channel iron, and consists primarily of longitudinal side members 12 and transverse members 14. Adjacent the forward end of said frame is rigidly secured a transverse tubular member 16, by means of brackets 18. Mounted for rotation in tube 16 is an axle member 20 which extends outwardly from both sides of said frame. To each end of axle 20 is securely attached a wheel 22 which is provided with cleats 24. It will be observed by referring to Fig. 2 that these cleats are oppositely angled on the two wheels to maintain the machine in alignment during its operation.

Pivotally secured to the front end of frame 10 at 26 is a hitch frame 28. This frame 28 engages both sides of frame 10 and extends forwardly and inwardly, thence forwardly to form a substantially wish-bone construction. The forward end of hitch frame 28 is provided with a rigidly attached clevis member 30, having a series of vertically disposed holes 32, into which may be fitted the clevis pin 34 to attach the draw bar 36 of a power vehicle, not shown. The draw bar 36 is maintained in a substantially fixed, vertical position, thereby supporting the hitch frame 28 against vertical movement. An arcuate member 38, welded or otherwise securely attached to frame 10, is provided at each side of the machine to vary the angled relation between frame 10 and hitch frame 28. Pin 40 extends through one of the holes 42 in member 38, thence through the adjacent leg of frame 28. With this construction, it is apparent that the rear end of frame 10 may be raised to any desired height during the transporting of the machine by merely removing pin 40, raising upwardly on the rear end of frame 10, and inserting the pin in one of the upper holes formed through 38.

When the machine is in operation, it is apparent that the rear end of frame 10 is lowered in a like manner to a depth suitable for proper cultivation and grading. Arms 44, pivotally mounted intermediate their ends on tube 16, serve to carry a transverse shaft 46, on which is rigidly mounted a gang of laterally spaced discs 48. These discs are preferably disposed in planar, longitudinal relation to the line of draft of the machine. These discs, as shown, are of the rolling colter type, however, in certain types of soil they might be slightly dished. The forward, upward end of 44 is provided with a latch member 50, which is adapted to engage notches 52 formed on the arcuate surface of plate 54. The depth of cut of discs 48 may, by the above means, be easily varied. As an auxiliary means of securing lever 44 in fixed relation with the frame, an arcuate roll of holes 56 is formed through plate 54 for receiving bolt 58, whereby the arm and plate are rigidly secured together.

It is desired to control the peripherial speed of discs 48 and also to positively drive them as the machine is moved. For this purpose, a sprocket wheel 60 is securely attached to axle 20, while sprocket wheel 62 is made rigid with shaft 46. A sprocket chain 64 operatively connects 60 and 62 so as to impart movement to discs 48 as the machine is drawn forwardly. The relative forward movement of the machine and the peripherial speed of 48 may be varied by simply replacing one or both of the sprocket wheels.

Positioned rearwardly of axle 20 is a shaft 66 which is rotatably carried in bearings 68, which in turn are secured to the lower side of members 12. On this shaft 66, intermediate members 12, is a rigidly attached drum 70. This drum serves as a carrier for spaced-apart rows of radially disposed teeth 72, the teeth of adjacent rows being disposed in staggered relation. Intermediate each row of teeth, and extending longitudinally of said drum is a radially disposed cutting blade 74. Teeth 72 are preferably flattened adjacent their outer ends and should be inclined slightly in the direction of their travel. These teeth extend beyond the radial blades 54 and serve to completely pulverize the ground after it has been cut into strips by the cutter discs 48. Shaft 66, together with its rigidly attached ground working tools, is rotated as the machine is moved forwardly by means of sprocket wheel 76, which is securely attached to wheel 22 and sprocket wheel 78 which is pinned to shaft 66, together with an associated chain 80.

For protective purposes, blade 74 and teeth 72 are covered with a suitable hood 82. Due to the relative sizes of sprocket wheels 76 and 78, the peripherial speed of teeth 72 will be slightly greater than the forward movement of the machine, thereby producing a tearing effect and not merely a puncturing of the soil, as would be obtained if they were permitted to be rotated by their contact with the ground. A scraper blade and terracing member 84 is pivotally mounted by means of arms 86 and 88 at 90 to the rear end of frame 10. This blade 84 is maintained in a predetermined position relative to the frame by means of arms 92 which are integral with arms 86 and 88 respectively.

Arcuate plate 94 is provided with a series of radially disposed holes 96, through which bolt 98 passes to secure arm 92 against movement. Hand lever 100 is provided at the rear side of scraper blade 84 to facilitate lifting of the blade during the adjusting operation. Blade 84 is provided with a hardened cutting bit 120 which extends in substantially a horizontal line disposed perpendicular to the line of draft of the machine. The upper portion of the blade extends outwardly and rearwardly from one side of the machine to the other, thereby producing an outwardly and rearwardly extending intermediate surface which serves to carry the soil to the right side of the machine. The acute angle of the forward portion of the blade to the ground surface causes the soil at the delivery side of the blade to be raised, thereby making it possible to produce relatively high terraces. For the convenience of attaching a drag or harrow to the machine, eyes 102 are secured to frame 10.

During the actual operation of the machine in the field or on the road, when it is desired to raise and lower the rear portion of the frame 10, frequently bolts 40 are removed and the following depth control mechanism is used. This mechanism consists of a fulcrum 104, rigidly attached to tube 16, to which is pivotally mounted intermediate its ends, a lever 106. This lever is pivotally attached at 108 to a U-shaped bail 110 which spans frame 10 and engages shaft 66 at 112. The forward end of lever 106 is provided with a latch member 114 which is adapted to engage the notches 116 of the notched arcuate standard 118 which is carried by hitch frame 28. It is contemplated to use platforms on both frames 10 and 28 for convenience of the operator, furthermore, when the ground is being worked which is extremely hard, it might be desirable to weight the machine down by placing heavy material, such as sand or rocks, on either or both of the frames.

Cutters 48, teeth 72 and scraper blade 84 are provided with separate and independent adjusting means, thus making it possible to obtain any desired relation between these ground working tools.

Since disc cutters 48 and cutters 74 are disposed at an angle to each other, it is evident that any corn stocks or other elongated members that might be on the ground being worked will be cut into short lengths regardless of their position relative to the machine. When using the machine in the field, the scraper blade will be raised to the inoperative position, and a drag or harrow may be attached to condition the surface of the ground.

To add weight to the machine the drum might be filled with some heavy material, such as sand.

Having thus described the invention, what is claimed as new and desired to be secured by Letters Patent is:

1. A pulverizing and grading machine comprising a frame having carrying wheels; a hitch frame pivoted to said frame and adapted to be secured at its forward end to the draw bar of a power vehicle; means interconnecting said frame and hitch frame whereby the angle between them may be varied; gangs of ground working tools carried by said frame at the rear of the axis of said wheels; means interconnecting said wheels and certain of said tools whereby said tools are rotated; and means for independently adjusting the vertical position of said gangs of tools.

2. A pulverizing and grading machine comprising a frame having a pair of axially disposed carrying wheels; means for maintaining said frame in a predetermined, substantially fixed position relative to the surface of the ground being worked; gangs of ground working tools rotatably carried by said frame and independently adjustable thereto; means interconnecting said gangs of tools with said wheels whereby the tools are rotated as the machine is moved; and a vertically adjustable scraper blade carried by said frame.

3. A pulverizing and grading machine comprising a frame having carrying wheels; a hitch frame pivoted to said frame and adapted to be secured at its forward end to the draw bar of a power vehicle; hand operable means interconnecting said frame and hitch frame whereby the angle between them is varied; gangs of ground working tools rotatably carried by said frame and vertically adjustable thereto; means operable, as the machine is moved, to rotate said tools; and a vertically adjustable blade carried by said frame to the rear of said tools.

4. A pulverizing and grading machine comprising a frame having a pair of axially disposed carrying wheels; means for adjusting the angle of said frame relative to the ground; a gang of vertically adjustable, spaced-apart cutter discs positioned in planar alignment with the direction of travel of said machine and adapted to be rotated as said machine is moved; a rotatably mounted drum carried by said frame having spaced-apart, longitudinally disposed rows of radial teeth extending outwardly therefrom; radially disposed blades carried by said drum intermediate said rows of teeth; means interconnecting said drum and wheels whereby said drum may be rotated as said wheels are rotated; and adjustable grading means carried by said frame at the rear of said cutters.

5. A pulverizing and grading machine comprising a frame having a pair of axially disposed carrying wheels; means for maintaining said frame in a predetermined, substantially fixed position relative to the surface of the ground being worked; gangs of ground working tools rotatably carried by said frame and independently adjustable thereto; means interconnecting said gangs of tools with said wheels whereby the tools are rotated as the machine is moved; and a vertically adjustable scraper blade carried by said frame at its rear portion, said blade having its lower cutting edge substantially perpendicular with the line of travel of the machine and its upper edge angled outwardly and rearwardly of said line whereby the soil may be moved to one side of the machine.

EDWARD M. NOWLIN.